United States Patent [19]

Narushima et al.

[11] Patent Number: 4,624,127
[45] Date of Patent: * Nov. 25, 1986

[54] METHOD AND APPARATUS FOR MEASUREMENT OF THICKNESS UTILIZING ULTRASONIC PULSES

[75] Inventors: Isao Narushima, Tokyo; Morio Nakano, Kanagawa, both of Japan

[73] Assignee: Teitsu Denshi Kenkyusho Co., Ltd., Kawasaki, Japan

[ * ] Notice: The portion of the term of this patent subsequent to Dec. 25, 2000 has been disclaimed.

[21] Appl. No.: 274,453

[22] Filed: Jun. 17, 1981

[30] Foreign Application Priority Data

Feb. 17, 1981 [JP] Japan .................................. 56-21952

[51] Int. Cl.$^4$ ............................................ G01N 29/00
[52] U.S. Cl. ..................................... 73/1 DV; 73/610
[58] Field of Search ............. 73/1 DV, 597, 609, 610, 73/615, 617, 644

[56] References Cited

U.S. PATENT DOCUMENTS 3,485,087 12/1969 Brech ..................................... 73/615
3,538,752 11/1970 Weinbaum ............................ 73/615
4,324,141 4/1982 Stearn ................................ 73/1 DV

FOREIGN PATENT DOCUMENTS 132864 11/1977 Japan .

Primary Examiner—Stephen A. Kreitman
Attorney, Agent, or Firm—Fleit, Jacobson, Cohn & Price

[57] ABSTRACT

Method and apparatus are disclosed for measurement of the thickness of a workpiece by periodically transmitting ultrasonic pulses into a workpiece by means of a probe provided at its front surface with a delay material, receiving ultrasonic echo pulses reflected from the bottom surface of the workpiece, measuring the period of time corresponding to the period of time elapsed from the transmission of each ultrasonic pulse to the reception of its related echo pulse minus the period of time corresponding to the propagation time of the ultrasonic pulse through the delay material which is specified by the setting of a zero-point adjusting circuit, calculating the thickness of the workpiece from such measured time periods, and displaying the thickness value thus calculated on a display. The setting of the zero-point adjusting circuit is carried out by adjusting the setting of the zero-point adjusting circuit so that the value displayed on the display becomes substantially zero while keeping the probe separated from the workpiece.

7 Claims, 5 Drawing Figures

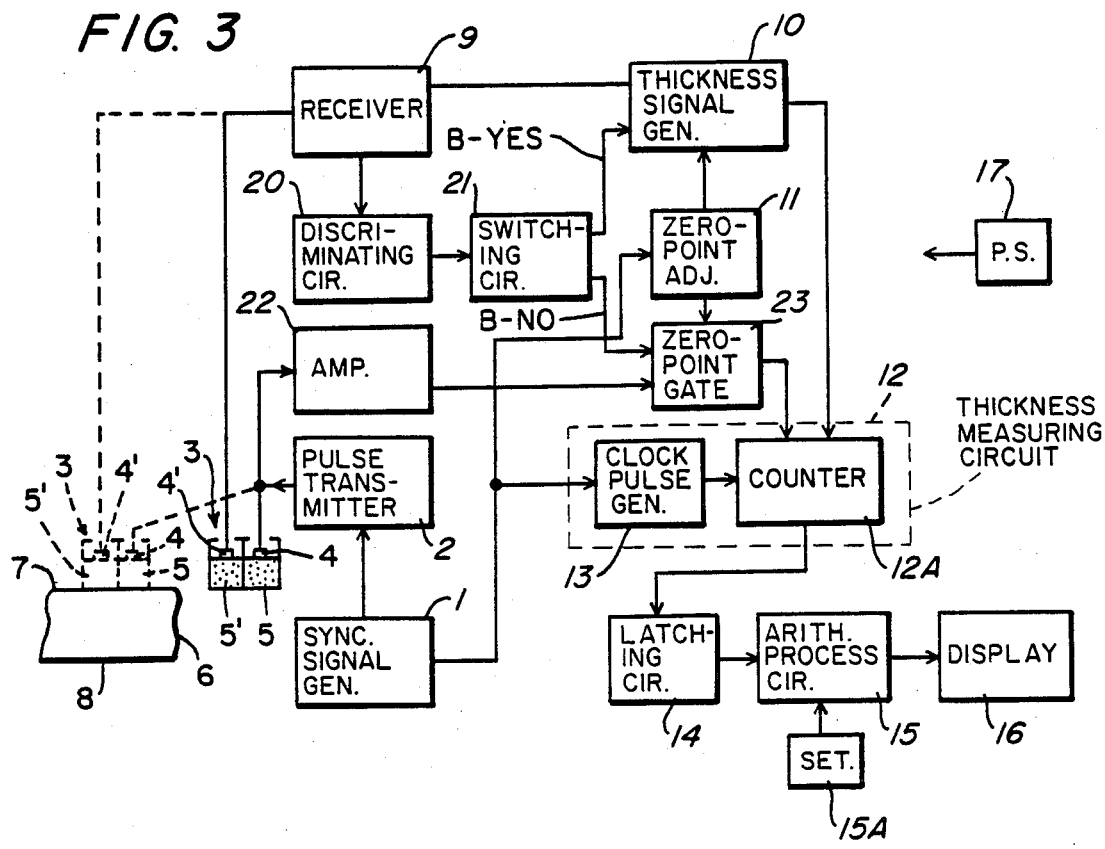
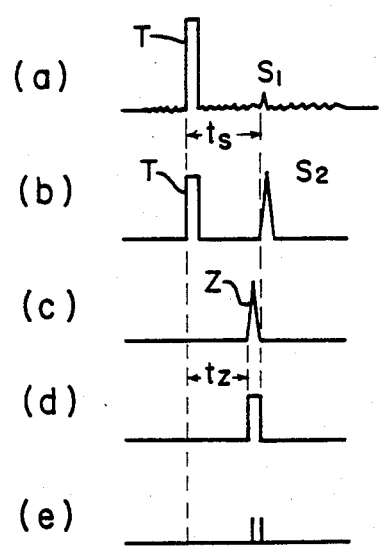
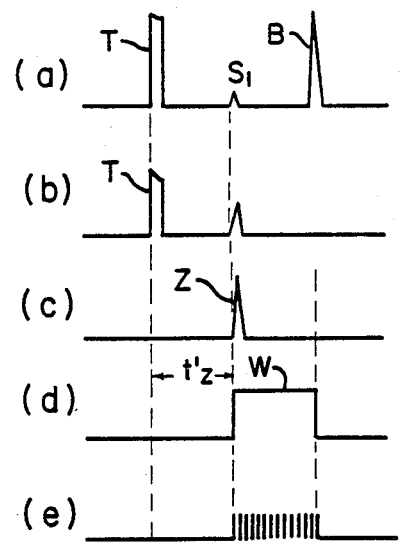

METHOD AND APPARATUS FOR MEASUREMENT OF THICKNESS UTILIZING ULTRASONIC PULSES

BACKGROUND OF THE INVENTION

This invention relates generally to a method and apparatus for measuring the thickness of a workpiece by the utilization of ultrasonic pulses, and more particularly to such a method and apparatus wherein zero-point adjustment can be accurately effected with a simple operation.

There have been known thickness measuring apparatuses wherein ultrasonic pulses are caused to be periodically transmitted into a workpiece from one surface thereof, and ultrasonic echo pulses reflected from the bottom surface of the workpiece are received so as to measure the thickness of the workpiece from the propagation time of the ultrasonic pulses through the workpiece. Such thickness measuring apparatuses generally employ a probe comprising a transducer provided at its front surface with a delay material in order to improve the separation between the transmitted pulses and the received pulses. In such apparatus, in order to obtain the propagation time of the ultrasonic pulse corresponding to the thickness of the workpiece, the process of subtracting the propagation time of the ultrasonic pulse through the delay material from the total period of time elapsed from the transmission of each ultrasonic pulse to the reception of its related ultrasonic echo pulse is required. Generally, the apparatus has a zero-point adjusting circuit included therein which is used to set the period of time corresponding to the propagation time of the ultrasonic pulse through the delay material. More particularly, the zero-point adjusting circuit provides a signal an adjustable period of time after the transmission of each ultrasonic pulse, such signal being applied to a gate adapted to be enabled from the time of reception of such signal to the time of reception of the related echo pulse reflected from the bottom surface of the workpiece to thereby develop a signal having a duration proportional to the thickness of the workpiece. The operation of adjusting the setting of the zero-point adjusting circuit is referred to as "zero-point adjustment operation".

Conventionally, such zero-point adjustment operation has been performed by causing the probe to contact a standard test-piece of a known thickness and adjusting the setting of the zero-point adjusting circuit until the thickness value displayed on the display reaches substantially the same value as the known thickness value.

However, the known thickness measuring apparatus has the defect that the zero-point adjustment operation is rather troublesome and time-consuming because it requires the use of a standard test-piece of a known thickness, the defect that a relatively long time is wasted because such troublesome and time-consuming zero-point adjustment operation must frequently be effected for the reason that the propagation speed of the ultrasonic pulses within the delay material varies depending upon the ambient temperature, and the defect that, particularly in the case of a small-size portable measuring apparatus having a test-piece attached on the outer casing thereof, the contact medium material to be used with such test-piece may flow out and spread to contaminate the apparatus or may flow into the interior of the apparatus through gaps between the casing thereof and the adjusting devices and meters provided therein, thus resulting in malfunction of the apparatus.

SUMMARY OF THE INVENTION

Accordingly, an object of this invention is to provide a method and apparatus for measurement of the thickness of a workpiece by the utilization of ultrasonic pulses which obviates the above-mentioned defects of the known method and apparatus and which makes it possible to carry out the zero-point adjustment operation accurately but with a simple operation.

Another object of the invention is to provide a method and apparatus of the above kind which does not require the use of a standard test-piece of a known thickness in performing the zero-point adjustment operation.

These as well as other objects of the invention may be attained by providing means for making it possible to utilize a portion of the ultrasonic echo pulse reflected from the front surface of the delay material at the front surface of the probe, in performing the zero-point adjustment operation.

Thus, in accordance with the invention, during the zero-point adjustment operation, the probe is kept separated from the workpiece, the period of time elapsed from the time of reception of an ultrasonic echo pulse reflected from the front surface of the delay material to the time of generation of an adjusting pulse by the zero-point adjusting circuit is measured so that the result of calculation obtained on the basis of such measurement is displayed on the display, and the setting of the zero-point adjusting circuit is adjusted until the value displayed on the display with the probe kept separated from the workpiece becomes substantially zero. After the setting of the zero-point adjusting circuit has been adjusted in this way, the probe is caused to contact the workpiece in order to make the measurement of the thickness of the workpiece.

Furthermore, in accordance with the invention, there is provided an apparatus for measuring the thickness of a workpiece which comprises, in addition to the conventionarily employed components (the probe, zero-point adjusting circuit, thickness measuring means, display, etc.), means for producing a zero-point pulse in response to an ultrasonic echo pulse reflected from the front surface of the delay material of the probe when the probe is kept separated from the workpiece, means responsive to the zero-point pulse and the adjusting pulse provided by the zero-point adjusting circuit for producing a gate signal having a duration equal to the time difference between the zero-point pulse and the adjusting pulse, and means for causing the measuring circuit to be supplied with the gate signal when the probe is kept separated from the workpiece. Thus, the apparatus makes it possible to achieve the setting of the zero-point adjusting circuit by adjusting it so that the value displayed on the display with the probe kept separated from the workpiece becomes substantially zero.

BRIEF DESCRIPTION OF THE DRAWINGS

Other and further objects and advantages of this invention will be apparent as the description thereof progresses, reference being had to the accompanying drawings wherein:

FIG. 3 is a block diagram of an ultrasonic thickness measuring apparatus constructed in accordance with the invention, FIGS. 4(a)–(e) are charts showing the time-relationship between the pulses appearing at several points in FIG. 3 during the zero-point adjustment operation, and FIGS. 5(a)–(e) are charts showing the time-relationship between the pulses appearing at several points in FIG. 3 during the operation of measuring the thickness of a workpiece.

DETAILED DESCRIPTION OF THE PREFERRED EMBODIMENT

Figure 1:
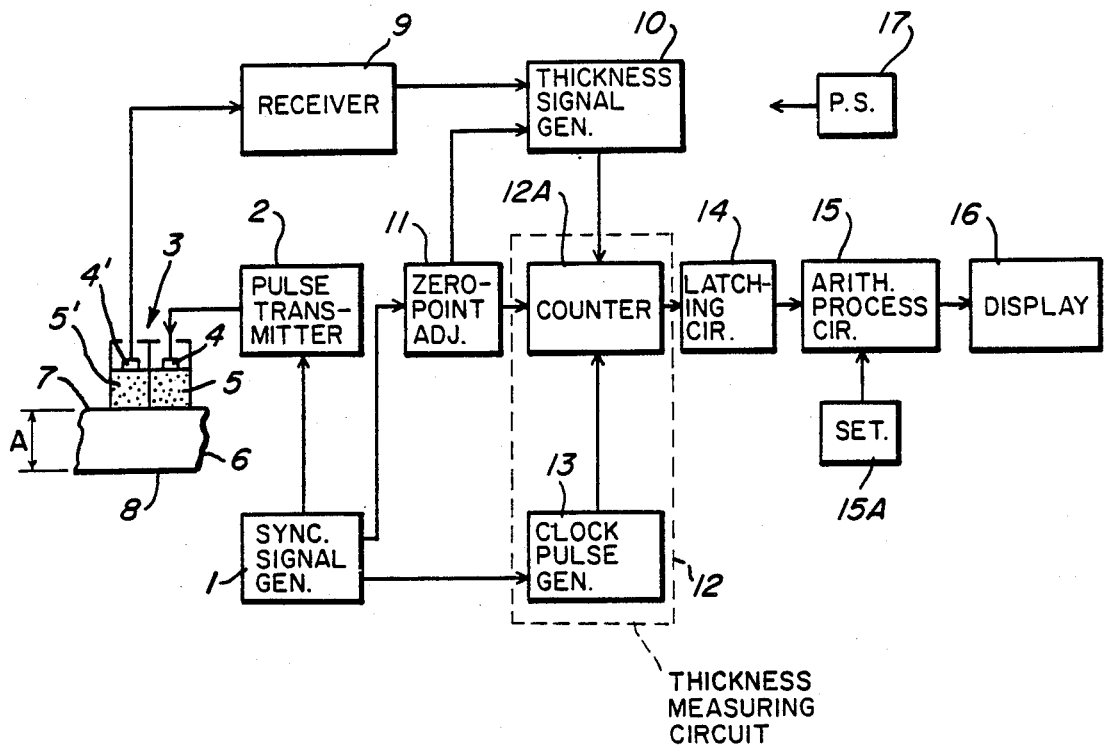
FIG. 1 is a block diagram of an example of known ultrasonic thickness measuring apparatus.
Figure 2:
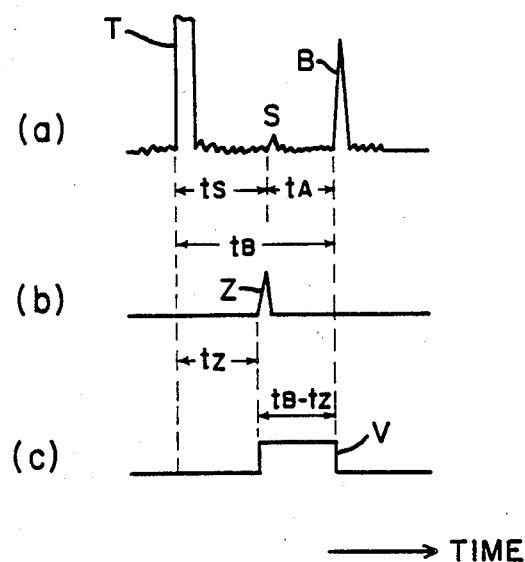
FIGS. 2(a)–(c) are charts showing the time-relationship between the pulses appearing at several points in FIG. 1.

Before proceeding to the description of the invention, an example of known ultrasonic thickness measuring apparatus will be explained by reference to FIGS. 1 and 2(a)–(c) wherein FIG. 1 is a block diagram of a known device of such kind and FIGS. 2(a)–(c) are charts showing the time-relationship between the pulses appearing at several points in FIG. 1.

In FIG. 1, a pulse transmitter 2 controlled by a synchronizing signal generator 1 periodically produces electric pulses T (FIG. 2(a)) and applies these pulses to a vibrator section 4 of a probe 3 where they are converted into ultrasonic pulses. Each of the ultrasonic pulses passes through a delay material 5 and a thin film of contact medium such as machine oil or the like (not shown) and is transmitted into a workpiece 6 of a thickness A from the upper surface 7 thereof. The ultrasonic pulse transmitted into the workpiece 6 is reflected by the bottom surface 8 thereof and passes through a delay material 5' to another vibrator section 4' of the probe 3 where it is converted into a voltage pulse B (FIG. 2(a)). In FIG. 2(a), it is seen that the voltage pulse B is produced a period of time $t_B$ after the generation of the electric pulse T, said time period $t_B$ corresponding to the period of time required for the ultrasonic pulse to go and return through the delay materials 5, 5' and the workpiece 6. In FIG. 2(a), the symbol "S" denotes a very weak pulse corresponding to an ultrasonic echo reflected at the front surface of the delay material 5 at which it contacts with the workpiece (Such echo will hereinafter be referred to as "zero-point echo" while the weak pulse S corresponding thereto will hereinafter be referred to as "zero-point pulse"). Although such a zero-point pulse will generally be masked by noise signals, it is shown in FIG. 2(a) for explanation's sake. The zero-point pulse S is produced a period of time $t_S$ after the generation of the electric pulse T, said time period $t_S$ corresponding to the period of time required for the ultrasonic pulse to go and return through the delay materials 5, 5'. It is apparent that $t_B - t_S = t_A$ is a period of time required for the ultrasonic pulse to go and return only through the workpiece 6 of a thickness A and it is this time period $T_A$ that is to be dealt with as a period of time corresponding to the thickness A.

However, because the zero-point pulse S is generally masked by noise signals as stated above, the circuit is usually arranged so that the zero-point adjustment operation may be performed in such a way as will be described hereunder.

The pulse voltage B produced by the vibrator 4' is amplified by a receiver 9 and passed to a thickness signal generating circuit 10 constructed by a multivibrator. On the other hand, an adjusting pulse voltage Z (FIG. 2(b)) is produced an adjustable period of time $t_Z$ after the generation of the electric pulse T by a zero-point adjusting circuit 11 timed by the synchronizing signal generator 1 and passed to the thickness signal generating circuit 10. The multivibrator constituting the thickness signal generating circuit 10 is turned on by the adjusting pulse voltage Z and turned off by the amplified voltage pulse B, thereby producing a gate voltage V having a duration ($t_B - t_Z$) as shown in FIG. 2(c). The gate voltage V is passed to a counter 12A included in a thickness measuring circuit 12. The time period $t_Z$ may be appropriately varied to calibrate the apparatus, and such calibration of the apparatus is effected, each time the measurement is to be made, by disposing a standard test-piece of a known thickness in place of a workpiece 6 under the probe in the manner described later.

The measuring circuit 12 also includes a clock pulse generator 13 timed by the synchronizing signal generator 1. The counter 12A included in the thickness measuring circuit 12 comprises an AND gate circuit and receives clock pulses from the generator 13 to count the duration of the gate voltage V by the clock pulses. The counted value is temporarily stored in a latching circuit 14 and then passed to an arithmetic processing circuit 15. The arithmetic processing circuit 15 is provided with a sound propagation speed setting means 15A and operates on the counted value passed thereto from the latching circuit 14 by the sound propagation speed set on the setting means 15A to thereby calculate the thickness of the workpiece 6. The calculated thickness value is displayed on a display 16, which may be constituted by a digital display. The reference numeral 17 designates a power source for supplying the components of the apparatus with necessary electric power.

In the case where the thickness of a steel material (the sound propagation speed therewithin is 5950 m/sec), for example, is to be measured by using the apparatus shown in FIG. 1, it is necessary to effect the zero-point adjustment operation in the following manner prior to the thickness measurement. The probe 3 is pressed onto a steel test-piece of a known thickness, for example 3.00 mm, through a contact medium material while the sound propagation speed on the setting means 15A of the arithmetic processing circuit 15 is set to be 5950 m/sec. Then, the setting of the zero-point adjusting circuit 11 is adjusted to vary the value of $t_Z$ until the known thickness of the steel test-piece, 3.00 mm in this example, is displayed on the display 16 whereupon the setting of the zero-point adjusting circuit 11 is locked at this point. The fact that the zero-point adjusting circuit 11 has been set in this manner means that $t_Z$ has been set to a value which is substantially equal to $t_S$. Thereafter, by replacing the steel test-piece by a workpiece to be measured, the thickness of the workpiece can be directly read on the display 16.

However, such known apparatus as is described in conjunction with FIG. 1 has many defects as mentioned previously, such as the defect that the zero-point adjustment operation is rather troublesome and time-consuming and the defect that in the case of a small size portable measuring apparatus having a test-piece attached on the outer casing thereof, the contact medium material to be used therewith may sometimes contaminate the components within the apparatus thus resulting in malfunction of the apparatus.

Next, this invention will be described by reference to FIGS. 3, 4(a)–(e) and 5(a)–(e) wherein FIG. 3 is a block diagram of an ultrasonic thickness measuring apparatus constructed in accordance with the invention, FIGS. 4(a)-(e) are charts showing the time-relationship between the pulses appearing at several points in FIG. 3 during the zero-point adjustment operation, and FIGS. 5(a)-(e) are charts showing the time-relationship between the pulses appearing at several points in FIG. 3 during the operation of measuring the thickness of a workpiece.

The circuit of FIG. 3 has substantially the same configuration as that of FIG. 1 except that it comprises, in addition to the components employed in the circuit of FIG. 1, a discriminating circuit 20 for discriminating whether an echo pulse reflected from the bottom surface of the workpiece is present or not, a switching circuit 21, an amplifier 22 for amplifying an electric pulse converted from an echo pulse reflected from the front surface of the delay material, and a zero-point gate circuit 23. Accordingly, the same reference numerals are used in FIG. 3 for respectively designating the same components as those in FIG. 1.

In FIG. 3, the connection of the probe 3 is shown by solid lines for the case where the zero-point adjustment operation is to be effected, and by dotted lines for the case where the operation of measuring the thickness of a workpiece 6 is to be effected.

First, description will be made for the case where the zero-point adjustment operation is to be effected.

The probe 3 is kept separated from the workpiece by holding it in the air. The ultrasonic pulse generated in response to the electric pulse T (FIG. 4(a)) sent from the transmitter 2 is reflected at the front surface (as viewed from the front side of the probe 3) of the delay material as an echo pulse. A major part of such echo pulse reaches the vibrator 4 where it is converted into such a zero-point electric pulse $S_2$ as is shown in FIG. 4(b) for application to the amplifier 22, whereas a minor part of such echo pulse propagates through the delay material 5' and through air to the vibrator 4'. The ultrasonic echo pulse having reached the vibrator 4' is converted thereby into such a very weak zero-point electric pulse $S_1$ as is shown in FIG. 4(a) and then passed to the receiver 9. It is apparent that both of the zero-point pulses $S_1$ and $S_2$ are generated a period of time after the generation of the electric pulse T, such time period corresponding to the propagation time $t_S$ of the ultrasonic pulse through the delay material, that is, the period of time required for the ultrasonic pulse to go and return through the delay material. Also, it is apparent that, in this case, there is no pulse voltage B in the input signal to the receiver 9 which correspond to an echo pulse reflected from the bottom surface of the workpiece, since the probe 3 is kept separated from the workpiece.

The discriminating circuit 20 has the function of discriminating whether a pulse corresponding to a pulse voltage B is present or not in the output signal of the receiver 9, and the switching circuit 21 responsive to the signal from the discriminating circuit 20 enables its output indicated by "B—NO" to activate only the signal path from the zero-point gate circuit 23 to the counter circuit 12A if a pulse corresponding to a pulse voltage B is not present, while, the circuit 21 enables its output indicated by "B—YES" to activate only the signal path from the thickness signal generating circuit 10 to the counter circuit 12A if a pulse corresponding to a pulse voltage B is present.

The zero-point gate circuit 23 is composed of a multivibrator which is turned on in response to an adjusting pulse voltage Z (FIG. 4(c)) which is produced an adjustable period of time "$t_Z$" after the generation of the electric pulse T as in the circuit of FIG. 1, and turned off in response to an amplified zero-point pulse $S_2$ from the amplifier 22, thereby producing a signal of an adjustable duration such as is shown in FIG. 4(d).

During the zero-point adjustment operation, since no pulse voltage B is present, the switching circuit 21 enables its output "B—NO" so that the measuring circuit 12 is supplied with the signal from the zero-point gate circuit 23. The signal received by the measuring circuit 12 is counted by the clock pulses from the clock pulse generator 13, and the counted value is passed through the latching circuit 14 to the arithmetic processing circuit 15. The output signal of the circuit 15 is displayed on the digital display 16. FIG. 4(e) shows the clock pulses counted in the measuring circuit 12.

At this time, the setting of the zero-point adjusting circuit 11 is adjusted to appropriately vary the value of $t_Z$ until the value displayed on the display 16 becomes "0.00 mm". Let us suppose that the value displayed on the display 16 becomes "0.00 mm" when the value of $t_Z$ is varied to be $t_Z'$. This means that the value $t_Z'$ exactly equals the value $t_S$. Therefore, the setting of the zero-point adjusting circuit 11 is locked at such point that the value $t_Z$ equals such value $t_Z'$. With the setting of the zero-point adjusting circuit 11 locked in this way, the adjusting pulse voltage Z will be produced at the time point exactly corresponding with the time point of generation of the zero-point pulse $S_2$.

In this manner, the invention makes it possible to provide a correctly calibrated zero-point adjustment with ease but without use of any standard test-piece.

Next, description will be made of the operation of measuring the thickness of the workpiece 6.

The sound speed setting means 15A is set at the sound propagation speed within the workpiece 6 and the probe 3 is pressed to be in contact with the upper surface 7 of the workpiece 6 through a contact medium material, under the condition that the setting of the zero-point adjusting circuit 11 has been adjusted in the manner described above and locked thereat.

The ultrasonic pulse generated by the vibrator 4 in response to the electric pulse T sent from the transmitter 2 propagates through the delay material 5 and the workpiece 6, so that the vibrator 4' produces a very weak zero-point pulse $S_1$ and a pulse voltage B due to the reflection of ultrasonic pulse at the bottom surface 8 of the workpiece 6, as in the case of the apparatus of FIG. 1, and passes them to the receiver 9.

In this case, since the discriminating circuit 20 detects the presence of a pulse voltage B, the switching circuit 21 enables its output "B—YES" so that the measuring circuit 12 is supplied with the signal from the thickness signal generating circuit 10. The signal received by the measuring circuit 12 is counted by the clock pulses from the clock pulse generator 13, and the counted value is passed through the latching circuit 14 to the arithmetic processing circuit 15. The output signal of the circuit 15 is displayed on the display 16. The value displayed on the display 16 correctly indicates the thickness of the workpiece 6, because the setting of the zero-point adjusting circuit has been correctly adjusted as mentioned above. FIG. 5(c) shows the adjusting pulse voltage Z having been set at the correct position, FIG. 5(d) shows the thickness signal sent from the thickness signal generating circuit 10 to the counter circuit 12A included in the measuring circuit 12, and FIG. 5(e) shows the clock pulses counted in the measuring circuit 12.

Since the apparatus according to the invention has such a construction and function as described above, it has the advantage that it makes it possible to perform the zero-point adjustment operation correctly but without use of any standard test-piece of a known thickness, resulting in the following meritorious effect:

(1) The thickness measurement operation can be performed correctly and easily even if it has to be done under bad conditions, for example, on a stepladder of a relatively great height;

(2) There is no risk of malfunction resulting from contamination of the apparatus by contact medium material, even in the case of a small size portable measuring apparatus having a test-piece attached on the outer casing thereof; and (3) Because the apparatus according to the invention is constructed so that, if the probe is separated from an object to be measured, the signal path from the zero-point gate circuit 23 to the counter circuit 12A (that is, the signal path adapted to be activated by the output "B—NO" of the switching circuit 21) is immediately activated to enable the operator to directly read the figures of zero-point on the display, the operator can make the measurement of the thickness of the object at its many points while recognizing the setting of the zero-point adjusting circuit each time the point of measurement is changed. If error occurs due to change in sound propagation speed within the delay material which is apt to be affected by variation in temperature of the atomsphere in which it is placed, figures other than "0.00" are immediately displayed, so that the operator can immediately perform the calibration or zero-point adjustment operation.

Having described a preferred embodiment of the invention, it will now be apparent to one skilled in the art that various modifications ray be made without departing from the inventive concepts. For example, the display may be an analog display, and each of the measuring circuit and the arithmetic processing circuit may have a different construction from that shown in FIG. 3 so long as they are arranged so that the signal ultimately obtained as a result of the operations performed by these circuits may be displayed on the display as a signal representing the thickness of an object to be measured. Therefore, it is felt that the invention should not be restricted to its described embodiment but rather should be limited only be the spirits and scope of the appended claims.

What is claimed is:

1. A method for measurement of the thickness of a workpiece comprising the steps of periodically transmitting ultrasonic pulses into a workpiece from one or an upper surface thereof and receiving ultrasonic echo pulses reflected from the bottom surface thereof by means of a probe provided at its front surface with a delay material, measuring the period of time corresponding to the period of time elapsed from the time of transmission of each ultrasonic pulse to the time of reception of its related echo pulse minus the period of time specified by a zero-point adjusting circuit, calculating the thickness of the workpiece from such measured time periods, and displaying the thickness value thus calculated on a display, characterized in that, during the zero-point adjustment operation, the probe is kept separated from the workpiece, the period of time elapsed from the time of reception of an ultrasonic echo pulse reflected from the front surface of the delay material to the time of generation of an adjusting pulse by the zero-point adjusting circuit is measured so that the result of calculation obtained on the basis of such measurement is displayed on the display, and the setting of the zero-point adjusting circuit is adjusted until the value displayed on the display with the probe kept separated from the workpiece becomes substantially zero, and thereafter the measurement of the thickness of the workpiece is effected while causing the probe to contact the workpiece.

2. The method according to claim 1 characterized in that the time period measurement is effected by means of clock pulses and the displaying of the calculated value is effected by means of a digital display.

3. An apparatus for measuring the thickness of a workpiece comprising a probe provided at its front surface with a delay material and adapted to transmit ultrasonic pulses into a workpiece and receive related ultrasonic echo pulses, means for periodically supplying electric pulses to said probe to cause it to produce said ultrasonic pulses, a zero-point adjusting circuit for producing, an adjusting pulse an adjustable period of time after the transmission of each ultrasonic pulse into the workpiece, means for producing a thickness signal having a duration equal to a period of time from the generation of said adjusting pulse to the reception of its related echo pulse, means for measuring the duration of said thickness signal, means for operating on the measured value by the propagation speed of the ultrasonic pulses, and means for displaying the signal from said operating means, characterized in that said apparatus further comprises means for producing a zero-point pulse in response to an echo pulse reflected from the front surface of said delay material when said probe is kept separated from the workpiece, means responsive to said zero-point pulse and said adjusting pulse for producing a gate signal having a duration equal to the time difference between said zero-point pulse and said adjusting pulse, and means for causing said measuring circuit to be supplied with said gate signal in place of said thickness signal when said probe is kept separated from the workpiece, whereby the setting of the zero-point adjusting circuit can be achieved by adjusting it so that the value displayed on said displaying means with the probe kept separated from the workpiece becomes substantially zero.

4. The apparatus according to claim 3 characterized in that said measuring means consists of a digital measuring circuit adapted to count the duration of said thickness signal by clock pulses, said operating means consists of a digital arithmetic processing circuit, and said displaying means consists of a digital display.

5. The apparatus according to claim 4 characterized in that said digital measuring circuit comprises a clock pulse generator and an AND gate circuit supplied with said thickness signal and clock pulses from said generator to pass clock pulses for only the period of duration of said thickness signal, and in that said digital measuring circuit is connected to said digital arithmetic processing circuit through a latching circuit adapted to temporarily store the clock pulses passed by said AND gate circuit.

6. The apparatus according to any of claims 3 through 5 characterized in that the apparatus further comprises means for discriminating whether an ultrasonic echo pulse reflected from the bottom surface of the workpiece is present or not, and means responsive to said discriminating means for applying to said measuring means said gate signals when such echo pulse is not present and said thickness signal when such echo pulse is present.

7. The apparatus according to claim 4 characterized in that said operating means is provided with means for digitally setting the propagation speed of the ultrasonic pulses through the workpiece.

* * * * *